Figure 3:
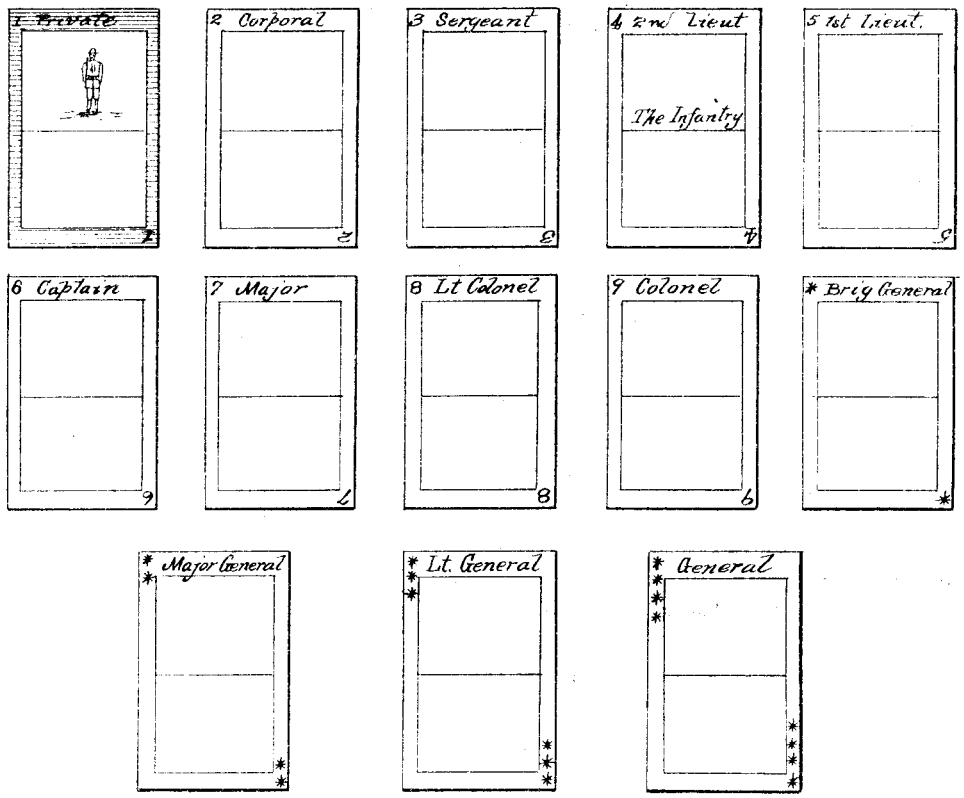

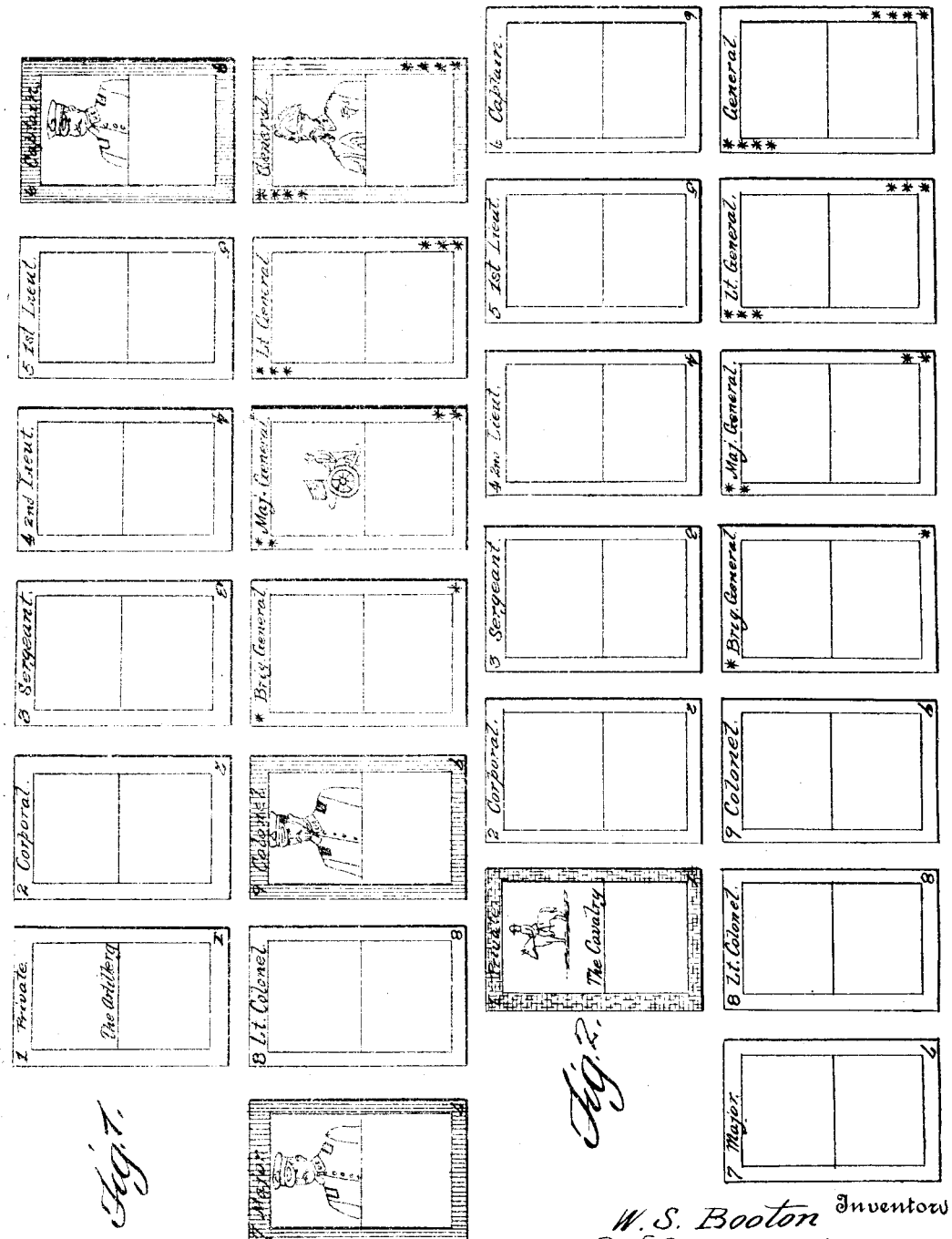

W. S. & C. B. BOOTON.
CARD GAME.
APPLICATION FILED APR. 28, 1913.

1,117,316.

Patented Nov. 17, 1914.
3 SHEETS—SHEET 2.

Witnesses
Mark De Grange
Francis T. Brewer

Inventors
W. S. Booton
and C. B. Booton,
By D. Swift H.
his Attorney

W. S. & C. B. BOOTON.
CARD GAME.
APPLICATION FILED APR. 28, 1913.
1,117,316. Patented Nov. 17, 1914.
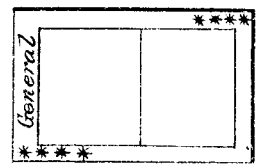
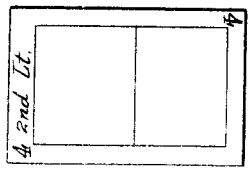 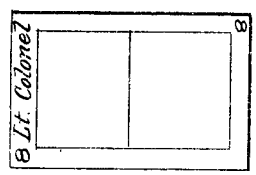 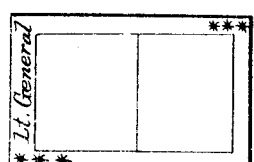
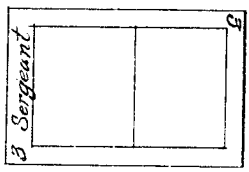 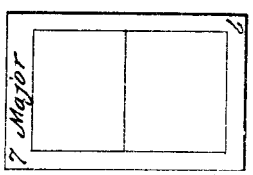 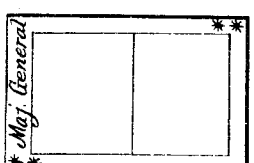
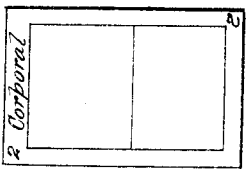 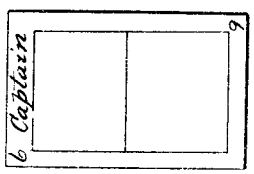 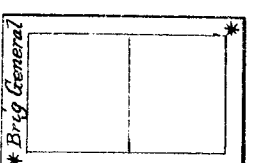
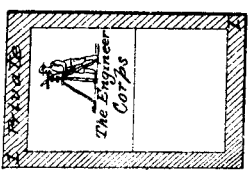 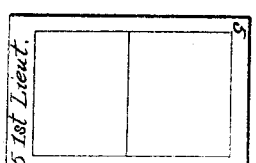 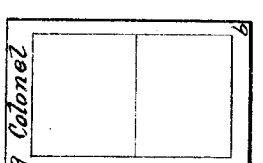
Fig. 4.
Witnesses
Frank DeGrange
Francis G. Boswell
Inventors
W. S. Booton
and C. B. Booton,
By D. Swift &c.
his Attorneys

UNITED STATES PATENT OFFICE.

WILLIAM S. BOOTON AND CLARA B. BOOTON, OF NASHVILLE, TENNESSEE.

CARD GAME.

1,117,316.  Specification of Letters Patent.  Patented Nov. 17, 1914.

Application filed April 28, 1913. Serial No. 764,044.

*To all whom it may concern:*

Be it known that we, WILLIAM S. BOOTON and CLARA B. BOOTON, citizens of the United States, residing at Nashville, in the county of Davidson and State of Tennessee, have invented a new and useful Card Game; and we do hereby declare the following to be a full, clear, and exact description of the invention, such as will enable others skilled in the art to which it appertains to make and use the same.

This invention relates to the art of games and the like, and more especially to a new and useful card game, which is not only of an interesting and instructive nature, but of a character to increase the game of chance, and one which is adapted to familiarize the players with the order of precedence of the offices of the various divisions of the Army and Navy, and which may be played by persons familiar with the ordinary playing cards.

This improved game, (which relates more especially to the Army) in practical fields, may be subjected to alterations, for instance, in lieu of respectively designating each card of a suit according to the rank of the officers of the Army, each card of each suit may be appropriately designated according to the rank of the officers of the Navy, as will be hereinafter set forth, provided such alterations, and others unforeseen at present, fall within the scope of what is claimed.

The invention comprises further features and combination of parts, as hereinafter set forth, shown in the drawings and claimed.

Figure 5:
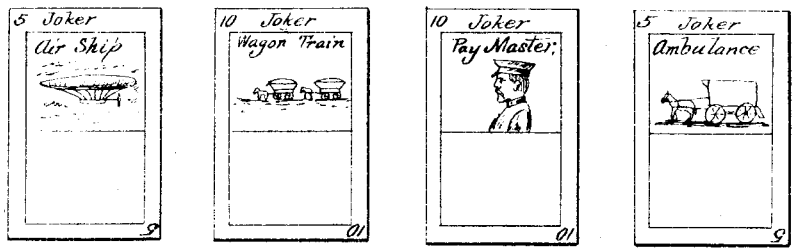

In the drawings:—Figure 1 shows a suit or series of thirteen cards, appropriately designated as the "Artillery," each card of such suit is appropriately designated according to the rank of the officers of the "Artillery;" in this suit a portion of the cards is numbered from "1" to "9" inclusive, while the remaining cards of the "Artillery" suit are further characterized by stars, according to the rank of the higher officers, for instance one star for Brigadier-General, two stars for Major-General, while three stars for Lieutenant-General, whereas four stars for General. The cards of the "Artillery" suit are adapted to be further characterized by a picture of an officer, which each card represents, for instance as shown on the card entitled "General." Fig. 2 illustrates a suit or series of cards having a yellow border, and entitled "The Cavalry," and likewise designated and characterized. Fig. 3 illustrates a suit or series of cards also thirteen in number entitled "The Infantry" having a blue border, and likewise appropriately designated and characterized. Fig. 4 illustrates a suit or series of cards entitled "The Engineer Corps" having a green border, each card of which suit is also likewise appropriately designated and characterized. Fig. 5 illustrates a series or suit of four cards entitled "Jokers," the cards of which are respectively called or designated "The Ambulance," "The Wagon Train," "The Paymaster," and the "Airship"; each card of the "Joker" suit having a picture corresponding to its title. The "Airship" and the "Ambulance" cards of the "Joker" suit are respectively designated with the character "5", while the "Wagon Train" and "Paymaster" cards are respectively designated with the numeral "10".

Referring more especially to the drawings, it will be observed that the game comprises a deck of fifty-six cards, with which the improved game is played according to the tactics of the Army, especially the Army of the United States.

The deck is divided into four suits, and four "Joker" cards. The four suits representing the four branches of the service, "The Artillery" (red), "The Cavalry" (yellow), "The Infantry" (blue) and "The Engineer Corps" (green). Each suit consists of thirteen cards, representing a private, two non-commissioned officers, and ten officers of the Army; and the four "Joker" cards represent the impedimenta of the Army. These "Jokers" are named the "Wagon Train", "The Ambulance", the "Air-ship" and the "Paymaster." The "Artillery" (red) ranks highest in value, the "Calvary" (yellow) ranks second, the "Infantry" (blue) ranks third, and the "Engineer Corps" (green) ranks fourth. Each suit has four star cards, which rank as the highest cards of the suit. These cards are: ranking downward; "The General" or "four stars", "The Lieutenant General", or "three stars", "The Major-General" or "two stars" and the "Brigadier General" or "one star". The remaining cards of each branch of the service are numbered from "1" to "9", indicating their rank from private (number one) to colonel (number nine).

*Example.*

| | |
|---|---|
| General | Four stars. |
| Lieut. General | Three stars. |
| Maj. General | Two stars. |
| Brig. General | One star. |
| Colonel | Number 9. |
| Lieut. Colonel | Number 8. |
| Major | Number 7. |
| Captain | Number 6. |
| 1st Lieutenant | Number 5. |
| 2nd Lieut. | Number 4. |
| Sergeant | Number 3. |
| Corporal | Number 2. |
| Private | Number 1. |

*Partners.*—This improved interesting instructive game according to the tactics of the Army is played by four players, two players on each side as partners. Partners may be selected by cut or chosen as suits the contestants.

*The cut.*—Each of the four players draws a card from the deck—the one drawing the lowest card of any branch of the service winning the deal.

*The deal.*—The dealer gives one card at a time, starting at the player on the left, until the entire deck has been exhausted. Each player gets fourteen cards.

*The bid.*—The player to the left of the dealer starts the bidding. This player may bid or pass the bid. The bidding begins at seven—meaning that the bidder contracts to take seven tricks at the suit indicated in bid. The bid is made on any of the four suits, or on no trumps. Each player has a right to bid in order, until the bidding closes. The bidding closes when three players in succession fail to make a higher bid. The bidder scores for each trick above six if successful in the bid.

*Example—Scale of count for each trick over six.*

| | |
|---|---|
| No Trumps | 11 points. |
| Artillery (red) | 10 points. |
| Cavalry (yellow) | 9 points. |
| Infantry (blue) | 8 points. |
| Engineer Corps (green) | 7 points. |

If a bid of seven Artillery (red) is made and the bidder and partner take nine tricks, they score ten points for each trick above six, making in all thirty points for this trick score. To over-bid another player the number of points bid must be greater.

*Example.*—A bid of seven on green suit can be over-bid by seven of any other of the suits, or no trumps, all being of greater value in the count than the green. However, eight on green will over-bid seven at no trumps, or any of the other suits, as this eight on green bid counts twice the value in the count of seven on green. Eight on green counts fourteen points or more than the highest seven trick bid counts. Highest seven trick bid is no trumps, which counts eleven points.

*The count.*—The score is kept for tricks won or lost and the joker score is kept separately. Two of the jokers counting ten, and two counting five as indicated on the cards. The jokers count for the side capturing them. Fifty points in the trick score or one hundred points in the joker score wins an engagement. Should the play on one bid, either by reason of the trick score or joker score give both sides a sufficient number of points to win an engagement—the engagement goes to the bidders, (the successful bidders). Two out of three engagements or two successive engagements wins a campaign.

*Forfeit.*—Should bidder fail to fulfil contract, the side forfeits in the count the points represented by the number of tricks bidder fails in bid.

*Example.*—Should player bid eight no trumps and captures only six tricks, the side loses eleven points (eleven points being the value of each no trump trick) for each trick short of the number bid, which in this instance would be twenty-two points, as side lacked two tricks of making bid.

*The game.*—A general high card suit hand is a no trump bid as the no trump counts more than any of the declared suits. If seven on green should be bid to start with, and seven red should then be bid, the third player could raise partner bid or bid whatever own hand might justify with knowledge received by the two former bids. Players must follow suit to the lead when possible in playing. If player cannot follow suit, then, and only then can a joker be played, a trump played, or a card of another suit be discarded. The object of the game being to take as many tricks as possible, and to capture the jokers.

*The joker leads.*—Should a player lead a joker the highest card of any suit played on it wins the trick unless trumped. At no trumps the highest ranking card regardless of suit wins the trick when the joker lead is made.

*Notes.*—While the probability of the play arising in an ordinary game is remote, in the event all four jokers happen to be played on one trick, the wagon train wins.

The joker score and trick score must be kept entirely separate, and after either side wins an engagement, former score is canceled and a new engagement starts.

In constructing the cards and playing the game according to the tactics and arrangement of the Navy, the suits respectively entitled "Artillery", "Cavalry", and the "Infantry", and the "Engineer Corps" may be entitled respectively "Dreadnaught Squadron" (red), "Battleship Squadron" (yellow), "Cruiser Squadron" (blue), and "Torpedo Boat Flotilla" (green). The cards of each squadron suit are respectively characterized and provided with an indicia, Admiral, Vice-Admiral, Rear Admiral, Commodore, Commander, Lieutenant Commander, Lieutenant, Ensign, Cadet, Boatswain, Gunner, Marine and Seaman. In addition to these squadron suits a suit of four cards respectively entitled, "The Collier", "The Hospital Ship", "The Repair Ship" and the "Dispatch Boat" are included, thereby making a deck of fifty-six cards.

The invention having been set forth, what is claimed as new and useful is:—

A game apparatus comprising a pack of fifty-six cards divided into four suits of thirteen cards each consecutively increasing in values, and a joker suit of four cards consecutively increasing in value, each suit representing a different ranking branch of the military service of a single country, viz: "Artillery", "Cavalry", "Infantry", and the "Engineer Corps"; nine cards of each of the suits of thirteen cards being provided with indicia from "1" to "9" inclusive, the remaining cards of each suit of thirteen being appropriately characterized, viz: "Brigadier General" one star, "Major General", two stars, "Lieutenant General", three stars, "General", four stars; said cards of the joker suit being appropriately characterized, viz: "Ambulance", "Wagon Train", "Paymaster", and "Airship", adapted to be captured during the course of the game; the "Wagon Train" card acting as the winning card on a trick provided all the jokers are played on one trick.

In testimony whereof we have signed our names to this specification in the presence of two subscribing witnesses.

WILLIAM S. BOOTON.
CLARA B. BOOTON.

Witnesses:
T. J. SMITH,
CHAS. RIDLEY NICHOL.